US012574670B2

(12) United States Patent
Zhu et al.

(10) Patent No.: US 12,574,670 B2
(45) Date of Patent: Mar. 10, 2026

(54) EARBUD ELECTRODE ALIGNMENT

(71) Applicant: Harman Becker Automotive Systems GmbH, Karlsbad (DE)

(72) Inventors: Yongsheng Zhu, Guangdong (CN); Genaro Woelfl, Salching (DE); Robb Zimmerman, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 662 days.

(21) Appl. No.: 18/087,970

(22) Filed: Dec. 23, 2022

(65) Prior Publication Data

US 2023/0129614 A1    Apr. 27, 2023

Related U.S. Application Data

(63) Continuation of application No. PCT/CN2020/097827, filed on Jun. 24, 2020.

(51) Int. Cl.

| | |
|---|---|
| *H01M 10/46* | (2006.01) |
| *H01R 13/24* | (2006.01) |
| *H01R 43/26* | (2006.01) |
| *H02J 7/00* | (2006.01) |
| *H04R 1/1025* | (2026.01) |

(52) U.S. Cl.
CPC ........... *H04R 1/1025* (2013.01); *H01R 13/24* (2013.01); *H01R 43/26* (2013.01); *H02J 7/0044* (2013.01); *H04R 2460/17* (2013.01)

(58) Field of Classification Search
CPC .. H02J 7/0042; H02J 7/0044; H04R 2460/17; H04R 2225/31; H04R 1/1025

USPC .................................. 320/107, 111, 114, 115
See application file for complete search history.

(56) References Cited

U.S. PATENT DOCUMENTS

| | | | |
|---|---|---|---|
| 11,276,517 B2 | 3/2022 | Bidaux | |
| 2012/0224710 A1 | 9/2012 | Terlizzi et al. | |

FOREIGN PATENT DOCUMENTS

| | | | | |
|---|---|---|---|---|
| CN | 101689717 A | * | 3/2010 | ............... H02J 7/00 |
| CN | 106331930 | | 1/2017 | |
| CN | 206620243 | | 11/2017 | |
| CN | 108899969 | | 11/2018 | |
| CN | 110300366 | | 10/2019 | |
| CN | 110677766 | | 1/2020 | |
| CN | 210491164 | | 5/2020 | |

(Continued)

OTHER PUBLICATIONS

Machine translation of CN-106331930A (Jan. 11, 2017) (Year: 2017).*

(Continued)

*Primary Examiner* — Edward Tso
(74) *Attorney, Agent, or Firm* — Burris Law, PLLC

(57) ABSTRACT

The present disclosure provides to a housing configured to receive an earbud. The housing comprises two power providing charging electrodes configured to charge the earbud when the earbud is positioned in the housing. The housing further comprises a first magnetic element arranged in the housing and having a geometry such that the first magnetic element encircles at least one electrode of the at least two electrodes, where the first magnetic element is configured to generate an attractive force for the earbud in combination with a second magnetic element provided in the earbud.

15 Claims, 6 Drawing Sheets

(56)         References Cited

FOREIGN PATENT DOCUMENTS

EP          1921893        5/2008

OTHER PUBLICATIONS

Office Action issued in corresponding CN Application 202080102029.
4, issued Nov. 30, 2024, 9 pages.
International Search Report issued in corresponding International
Application PCT/CN2020/097827, mailed Mar. 29, 2021.

* cited by examiner

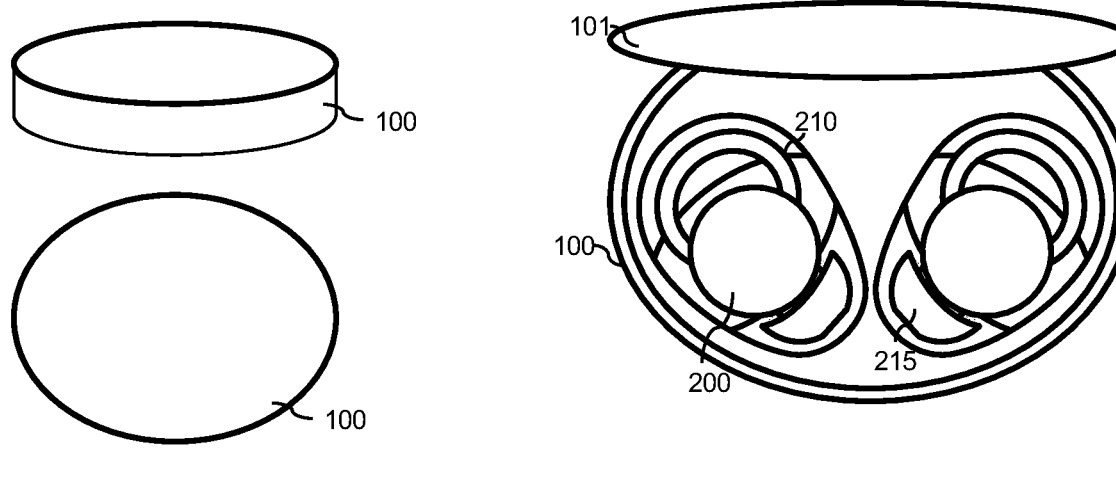
FIG. 1                    FIG. 2

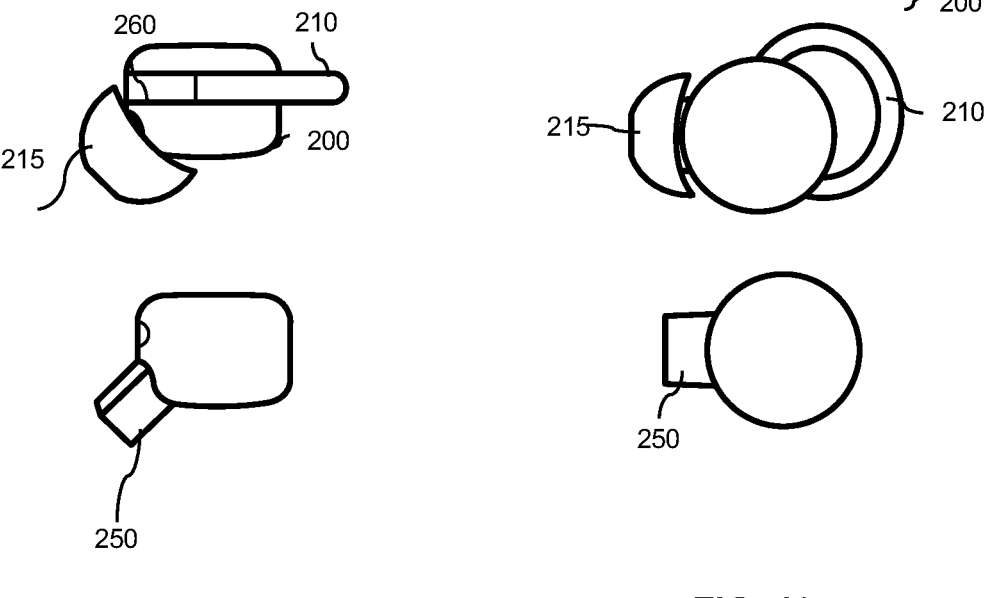
FIG. 9                    FIG. 10

EARBUD ELECTRODE ALIGNMENT

CROSS-REFERENCE TO RELATED APPLICATIONS

This application is a continuation of International Application No. PCT/CN2020/097827, filed on Jun. 24, 2020. The disclosure of the above application is incorporated herein by reference.

FIELD

The present disclosure relates to an earbud, a housing configured to receive the earbud, and to a system comprising the housing and the earbud.

BACKGROUND

The statements in this section merely provide background information related to the present disclosure and may not constitute prior art.

Wireless earbuds can be worn by a user in several situations. They may be employed for playback of audio, such as phone calls, music etc. In addition, noise masking earbuds are known and may cancel out the noise of the environment. One option for noise masking earbuds is the use of the earbuds during sleep. In this situation, the earbuds generate a sound which mask the noise in the environment. These known earbuds have to be recharged when not in use. To this end, a housing is provided and comprises power providing electrodes. The earbuds are placed in the housing, and the charging electrodes in the earbud may contact the power providing electrodes in the housing. Especially for earbuds that are used during the night and that charge during the day, the housing may provide an electrode alignment when the earbuds are placed in the housing. However, this applies also to any other earbuds which are recharged by placing them in a housing.

SUMMARY

This section provides a general summary of the disclosure and is not a comprehensive disclosure of its full scope or all of its features.

According to a first aspect, a housing is provided configured to receive the earbud, wherein the housing comprises two power providing electrodes configured to charge the earbud when the earbud is positioned in the housing. Furthermore, a first magnetic element arranged in the housing and having a geometry such that the first magnetic element encircles at least one electrode of the at least two electrodes, and wherein the first magnetic element is configured to generate an attractive force for the earbud in combination with a second magnetic element provided in the earbud.

When the first magnetic element encloses or encircles the power providing electrodes, the magnetic force between the first magnetic element and the second magnetic element centers the power providing electrodes with the charging electrodes of the earbud.

Furthermore, the corresponding earbud is configured to be connected to the user's ear wherein the earbud is a wireless earbud and comprises a rechargeable power source. The earbud furthermore comprises two charging electrodes configured to charge the rechargeable power source. Furthermore, the earbud comprises a second magnetic element having a geometry such that it encloses at least one charging electrode of the two charging electrodes, wherein the second magnetic element is configured to generate an attractive force for the earbud in combination with a first magnetic element provided in a housing, and wherein the rechargeable power source is configured to be recharged when the earbud is located in the housing.

The earbud also comprises a magnetic element which encloses or encircles at least one of the charging electrodes. With such a geometry, it is easier to center the force around the electrodes.

Furthermore, a system is provided comprising the housing and the earbud as discussed above or as discussed in further detail below.

It is to be understood that the features mentioned above and features yet to be explained below can be used not only in the respective combinations indicated, but also in other combinations or in isolation without departing from the scope of the present disclosure. Features of the above-mentioned aspects and embodiments described hereinafter may be combined with each other in other embodiments unless explicitly mentioned otherwise.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic top view and perspective view of the housing in which the earbuds can be located according to the teachings of the present disclosure;

FIG. 2 is a schematic view of the housing in an open state in which the earbuds are arranged for charging according to the teachings of the present disclosure;

FIG. 9 is a schematic view of the earbud body and the complete earbud in a side view according to the teachings of the present disclosure; and FIG. 10 is a top view of the earbud body and the complete earbud according to the teachings of the present disclosure;

Figure 3:
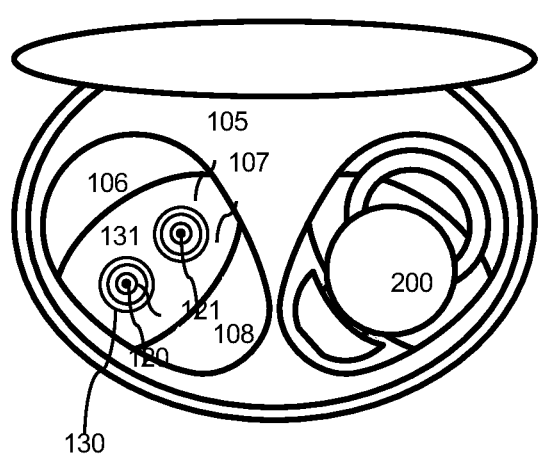
FIG. 3 is a schematic view of the housing in an open state of FIG. 2 in which one of the earbuds is removed according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may be implemented by an indirect connection or coupling. A coupling between components may be established over a wired or wireless connection.

FIG. 1 shows in the upper part a front perspective view of a charging case or housing 100 in which earbuds can be charged. The housing 100 is shown in the lower part in the top view. In the illustrated embodiment, the housing 100 has a substantially circular or oval shape. However, it should be understood that any other shape, such as a rectangular shape, may be used. FIG. 2 shows the housing in an open state with a lid 101 being open.

The housing 100 is configured to receive two earbuds 200. When the earbuds 200 are located in the housing 100, rechargeable power sources (not shown) provided in the earbuds 200 can be recharged. To this end, the housing 100 may have a connection to a power source (not shown), which provides electrical power to power providing electrodes provided for each of the earbuds 200 in the housing 100.

Referring to FIG. 3, the power providing electrodes (referred to hereinafter as "electrodes") of each of the earbuds are located within a recess 105, which can define different sections, such as a first section 106 receiving a locking ring 210 of the earbud 200 when the earbud 200 is located in the recess as shown in FIG. 2. The recess 105 defines a middle section 107 that receives the two power providing electrodes 120 and 121. The recess 105 defines a second section 108 located next to the middle section 107 and on the other side relative to the first section 106, and the second section 108 may receive an ear tip part 215 of the earbud 200 (FIG. 1), which is inserted into the ear channel of the user during use. The different sections 106, 107 and 108 may have different height levels. As an example, the section 107 is located lower compared to section 106, and the section 108 is located at a lower level compared to the section 107. These different height levels also help to make sure that the earbud 200 is correctly positioned within housing 100 and that a single position of the earbud 200 relative to the housing 100 provides for a reliable charging of the earbud 200.

As shown in FIG. 3, each of the power providing electrodes 120 and 121 is encircled by a magnetic element, such as element 130 and 131. The magnetic element has a substantially circular shape and comprises in the embodiment shown the electrode in its center.

Figure 4:
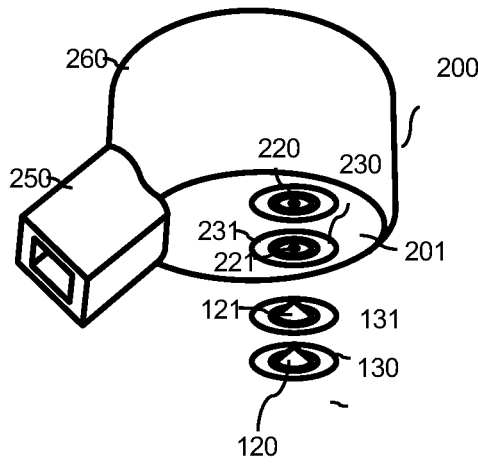
FIG. 4 is a schematic view of an arrangement of the electrodes from the earbud and the housing in a first embodiment according to the teachings of the present disclosure.

Referring to FIG. 4, the alignment of the power providing electrodes 120 and 121 in the housing 100 relative to the charging electrodes 220 and 221 provided in the earbud 200 is shown. The two charging electrodes 220, 221 are located on a lower surface 201 of the earbud 200, and the lower surface 201 is placed facedown in the recess 105, such as in the section 107. As shown, the earbud also comprises magnetic elements 230 and 231, which are located around the corresponding electrodes 220 and 221. The two magnetic elements 230 and 231, together with the magnetic elements 130 and 131, center the power providing electrodes 120 and 121 relative to the charging electrodes 220 and 221. As will be explained later in connection with FIGS. 6-8, the magnetic elements provided in the earbud 200 and the housing 100 may be implemented as permanent magnets. A further option is that one of the magnetic elements is implemented as a permanent magnet, and the other magnetic element is not a permanent magnet, but is magnetized by the other permanent magnet with which it comes into contact when the earbud 200 is located in the housing 100 for charging.

As shown in FIG. 4, the earbud 200 is shown without the locking ring and the ear tip part, as only the channel 250 is shown via which the sound is transmitted to the user's ear. Each electronic component provided in the earbud 200 were omitted for the sake of clarity, such as a receiver configured to wirelessly receive the audio signals or the rechargeable power source via which the earbud is powered when used by a user. In the embodiment shown, the earbud has a substantially cylindrical main body 260, however, other shapes might be used in other variations.

Figure 6:
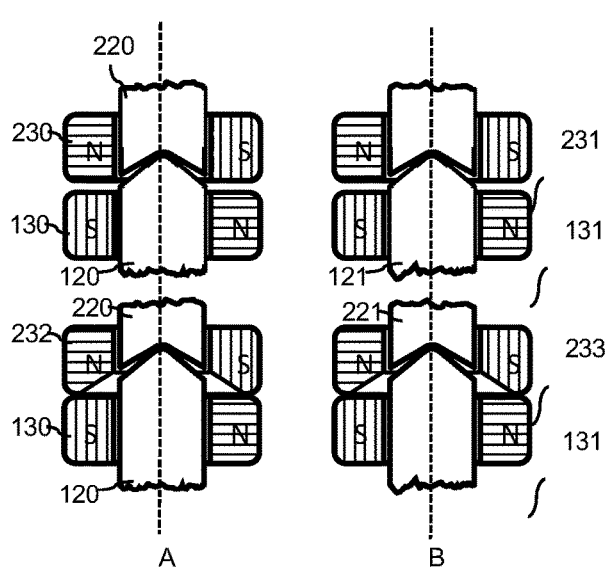
FIG. 6 is a schematic view of the electrodes contacting one another with the help of the two magnetic elements provided in the housing and the earbud, respectively, according to the teachings of the present disclosure.

FIG. 6 shows in more detail how the two magnetic elements provide a reliable connection between the power providing electrodes 120 and 121 and the charging electrodes 220 and 221. In one embodiment, the magnetic elements provided in the housing and the magnetic elements provided in the earbud are implemented as permanent magnets. The permanent magnet 130 has a south pole and a north pole, the permanent magnet 230 also has a north and south pole, and the attracting forces between the opposite poles center the charging electrodes 220 and 221 such that a middle axis of the power providing electrode coincides with the middle axis of the charging electrode, as shown by the axis A and axis B.

FIG. 6 also shows a permanent magnet provided in the earbuds is shaped such that the conically shaped tip of the power providing electrodes is centered relative to the charging electrodes 220 and 221. Accordingly, the permanent magnets 232 and 233 have at its inner circumferential edge a beveled edge. Furthermore, the power providing electrodes 120, 121 in the housing may be spring-loaded to increase the force by which the power providing electrodes contact the corresponding charging electrodes 220, 221. The charging electrodes may also be spring-loaded.

Figures 7A, 7B:
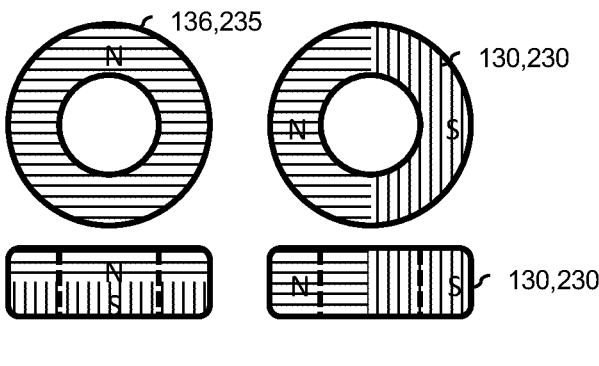
FIG. 7A shows one option of the magnetization of the magnetic elements used to improve the alignment of the electrodes relative to one another according to the teachings of the present disclosure.
FIG. 7B shows one option of the magnetization of the magnetic elements used to improve the alignment of the electrodes relative to one another according to the teachings of the present disclosure.

FIGS. 7A and 7B show a top view of the different possible implementations of the magnets shown in FIG. 6. The magnet has a circular shape and may be magnetized, such as shown in FIG. 7B, and the ring-shaped magnet comprises a first ring section implementing one pole, where the other ring section implements the other pole. In the lower part of FIGS. 7A-7B, the corresponding side view is shown. In FIG. 7A, the magnet may also have an axial magnetization so that one of the surfaces facing the other magnet shows one polarity, and where the opposite surface has the other polarity. Accordingly, the surfaces of the magnetic elements contacting the other magnetic elements during charging may each have a single polarity or may have both polarities.

Figure 8:
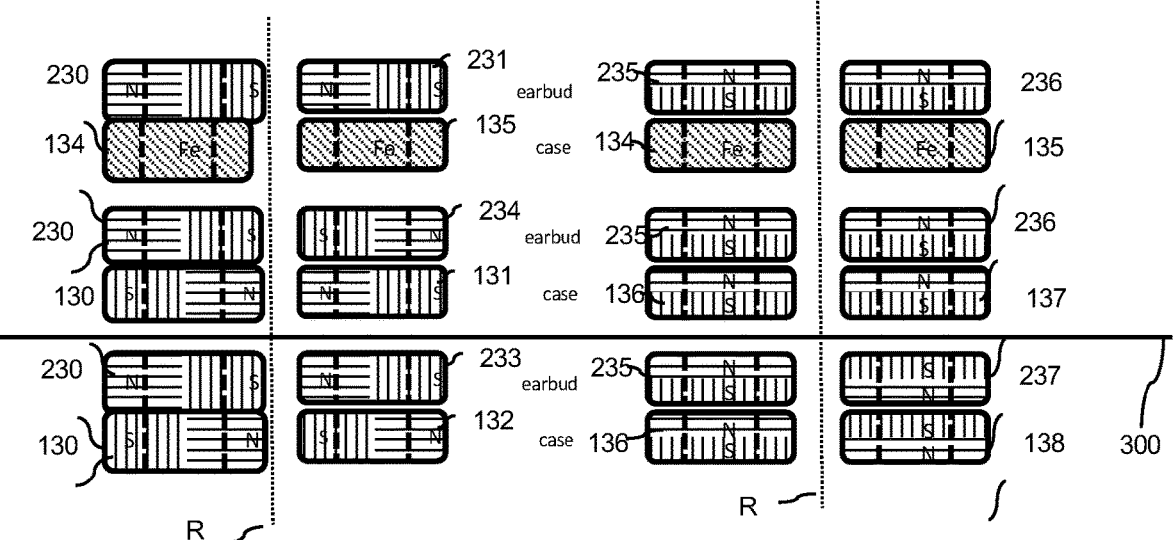
FIG. 8 shows different options how the pairs of the magnetic elements can be arranged relative to each other in which the electrode polarity can be either reversed or when a fixed electrode polarity is used according to the teachings of the present disclosure.

FIG. 8 shows different options for the first magnetic element provided in the housing and the second magnetic element provided in the earbud. FIG. 8 is separated into an upper part and a lower part. In the upper part above line 300 the earbud can be placed in the housing with 2 different positions that differ by a 180-degree rotation around a middle axis R located between the electrodes and magnets. The magnets in the earbud and the housing attract in both cases. This means that the polarity of the electrodes may be reversed in case the earbud is inserted in the housing with a 180-degree rotation around axes R. In the examples shown below line 300, the magnets are arranged such relative to each other that the magnets only attract one another, when the earbud is correctly positioned in the housing. Accordingly, this means that in the upper part, when the magnets of the earbud are rotated by 180° around an axis as shown in FIG. 8 and which is located between the magnetic elements or the electrodes, the magnets would still attract one another. This applies to the magnet pairs 130, 131 together with the pair 230, 234, and the pair 235, 236 together with the pair 136, 137. This would not be the case in the lower part, as by a 180° rotation magnets 230 and 233 relative to magnets 130 and 132, respectively, would be located above magnet 130, and the same pole would be positioned one above the other providing a repelling force. The same is true for the 180° rotation of magnets 235 and 237 relative to magnets 136 and 138, respectively. In the upper examples, the magnetic elements 134, 135 provided in the housing is implemented as a nonpermanent magnet, where the magnetization is obtained when the magnet in the earbud is approached. In the example shown, the material of the magnetic element in the housing is iron, however, any other material might be used. In the same way the permanent magnet may be provided in the housing and the nonpermanent magnet may be provided in the earbud.

In the second row in the middle, a form is shown in which both magnetic elements in the earbud and housing are implemented as permanent magnets. Magnet 230 attracts and is attracted by magnet 130, and in the same way, the two magnets 131 and 234 attract each other. Furthermore, when the earbud is positioned within the housing with a 180° rotation relative to the situation shown, the same attractive forces are obtained. In the embodiment shown in the lower row this symmetry is not obtained as if the magnets 230, 233 rotated by 180° around the middle axis R, the same polarities would be located above each other. The result would be a repelling force and not an attractive force. Therefore, magnet arrangements as shown in FIG. 8 and below the line 300 are useful to inhibit the connection between electrodes in the case and in the earbud to a predefined connection pattern. This may, for example, be provided for correct electrical electrode polarity. If such a predefined electrode connection pattern is provided for magnet arrangements as shown above the line 300 in FIG. 8, additional mechanical restrictions may be added to the charging case, which allow electrode connection with the desired connection pattern and/or electrical polarity.

In the three examples shown in the left column of FIG. 8, the magnets are magnetized such that the pole separation within the respective magnets is along an axial direction of the cylindrically shaped magnet, where in the right part of FIG. 8, the magnets are magnetized such that the poles are arranged relative to an axis perpendicular to the axial direction when the magnets are supposed to have a substantially cylindrical shape. In the left part of FIG. 8, the magnets are magnetized such that poles are separated by an axis extending in a direction in which the earbud is placed in the housing, where in the right part, the magnets are magnetized such that the poles are separated by an axis that is perpendicular to an axis extending in the direction in which the earbud is placed in the housing.

FIG. 9 shows a schematic drawing of a side view of the earbud 200 with the soft ear tip 215 and the locking ring 210, where in the lower part of FIG. 9, the earbud hard body is shown without the ear tip and the locking ring 210. The locking ring may be attached to the main body using a belt 260 to which the locking ring 210 is attached. FIG. 10 shows the earbud containing the soft ear tip 215 and the locking ring 210 from a top view, where the lower part of FIG. 10 shows the earbud hard body 200 with the locking ring 210 and the soft ear tip 215 being removed.

The locking ring 210 maintains the earbud in the ear of the user and may comprise a soft or elastic material.

Figure 5:
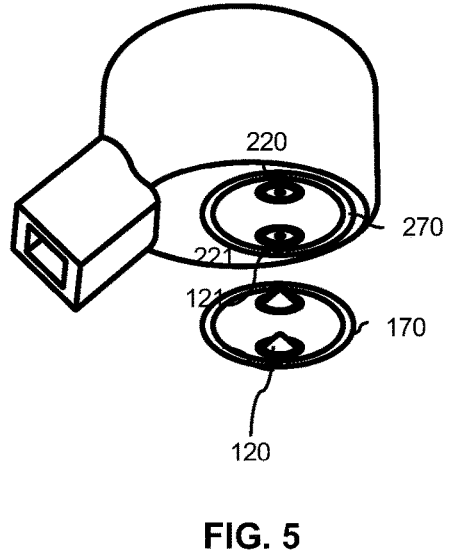
FIG. 5 is a schematic view of an arrangement of the electrodes from the earbud and from the housing in a further embodiment according to the teachings of the present disclosure.

In the examples given above, one magnet or magnetic element was provided for each of the electrodes to obtain an alignment of the electrodes. With reference to FIG. 5, another embodiment is shown in which a single magnetic element 270 is provided in the earbud that encircles both charging electrodes 220 and 221. In the same way the housing comprises a magnetic element 170, this magnetic element 170 also encircles both power providing electrodes 120 and 121. Similar to the embodiment shown in FIG. 8, both magnetic elements 270 and 170 may be permanent magnets In both examples shown in FIG. 4-5 or 6-8, the magnetic elements provided in the housing and the magnetic elements provided in the earbud are designed such that they have the same shape and substantially the same dimensions so that they align with each other when they are placed above each other. With a circular shape, both of the magnetic elements provided in the earbud and the housing have at least the same outer diameter.

From the above given explanation some general conclusions can be drawn:

Regarding the housing 100, two first magnetic elements may be provided wherein one magnetic element is provided for each of the two power providing electrodes. Each of the magnetic elements then encloses one of the power providing electrodes, as shown in FIGS. 4 and 6-8.

Furthermore, it is possible that the magnetic element of the housing encloses the two power providing electrodes, as discussed above with reference to FIG. 5.

In one embodiment, the first magnetic element provided in the housing and the second magnetic element provided in the earbud have a circular shape. Furthermore, it is possible that both magnetic elements have an oval, rectangular, or any irregular shape. Furthermore, in one embodiment, both the first and second magnetic elements have the same shape and the same dimension.

The first magnetic element may be a permanent magnet, however, the first magnetic element provided in the housing may also be a non-permanent magnet, which is magnetized when in contact with the permanent magnet.

Furthermore, it is possible that in case of two permanently magnetic elements, in the earbud and in the case, the magnetic poles of the four permanent magnets are arranged relative to one another such that they are rotationally symmetric with respect to their magnetic poles around an axis located in a center between the two permanent magnets when a rotation of 180° is carried out around this axis. Referring to FIG. 8, the lower row (below line 300) does not provide this rotational symmetry wherein the row of magnets shown above line 300 does provide this 180° symmetry.

The permanent magnets may be arranged such that an upper surface facing the earbud to be received has a single polarity. Furthermore, it is also possible that the permanent magnet is arranged such that an upper surface facing the earbud comprises the two polarities of the permanent magnet, as shown in the left part of FIG. 8. In the right part of FIG. 8, the surface facing the other magnet only has the single polarity.

As far as the system comprising the earbud and the housing is concerned, both the first and second magnetic elements may be permanent magnets. However, one of the first and second magnetic elements may be a permanent magnet, and the other may be a nonpermanent magnet that is only magnetized when in contact with the permanent magnet.

Furthermore, those magnetic elements may have the same shape and the same dimensions so that they are aligned with each other when one magnetic element is placed above the other magnetic element.

The discussion above provides a system in which the force is centered around the electrodes. As there might be one large magnetic element around both electrodes or two magnets, one for each electrode, or even more magnets for more than two electrodes, a high torsional alignment force is obtained due to the long mechanical lever between the magnets. Accordingly, a more reliable alignment is obtained with a better electrode contact. The design allows or inhibits the reversal of the electrode polarity. The user can drop the earbuds into the case, and they fall into the right position. No extra alignment is required by the user.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A housing configured to receive an earbud, the housing comprising:
    at least two electrodes configured to connect the earbud electrically when the earbud is positioned in the housing, and
    multiple first magnetic elements arranged in the housing, wherein each of the first multiple first magnetic elements encircles at least one electrode of the at least two electrodes, wherein each of the first magnetic elements is configured to generate an attractive force for the earbud in combination with a second magnetic element provided in the earbud,
    wherein one of the multiple first magnetic elements is provided for each of the at least two electrodes, and
    wherein two permanent magnets are arranged relative to one another such that they are not located rotationally symmetric with respect to their magnetic poles around an axis located in a center between the two permanent magnets when a rotation of 180 degrees is carried out around the axis.

2. The housing according to claim 1, wherein a first magnetic element of the multiple first magnetic elements and the second magnetic element are permanent magnets, wherein the first magnetic element has a first magnetic pole, wherein the second magnetic element has a second magnetic pole, and wherein the first magnetic element and the second magnetic element are arranged relative to one another such that they are located rotationally symmetric with respect to the first magnetic pole and a second magnetic pole around an axis located in a center between the first magnetic element and the second magnetic element when a rotation of 180 degrees is carried out around the axis.

3. The housing according to claim 1, wherein a first magnetic element of the multiple first magnetic elements and the second magnetic element are permanent magnets, wherein the first magnetic element has a first magnetic pole, wherein the second magnetic element has a second magnetic pole, and wherein the first magnetic element and the second magnetic element are arranged relative to one another other such that the first and second magnetic elements are not located rotationally symmetric with respect to the first magnetic pole and the second magnetic pole around an axis located in a center between the first magnetic element and a second magnetic element when a rotation of 180 degrees is carried out around the axis.

4. The housing according to claim 1, wherein a first magnetic element of the multiple first magnetic elements is arranged such that an upper surface of the first magnetic element facing the earbud to be received has a single polarity.

5. The housing according to claim 1, wherein a first magnetic element of the multiple first magnetic elements is arranged such that an upper surface of the first magnetic element facing the earbud to be received in the housing comprises two polarities.

6. The housing according to claim 1, wherein a first magnetic element of the multiple first magnetic elements encircles the at least two electrodes.

7. The housing according to claim 1, wherein a first magnetic element of the multiple first magnetic elements has a circular shape.

8. The housing according to claim 1, wherein a first magnetic element of the multiple first magnetic elements is a permanent magnet.

9. The housing according to claim 1, wherein a first magnetic element of the multiple first magnetic elements is not a permanent magnet and is configured to be magnetized when in contact with a permanent magnet.

10. A system comprising a housing and an earbud according to claim 1.

11. The system according to claim 10, wherein one of a first magnetic of the multiple first magnetic elements and the second magnetic element is a permanent magnet and the other of the first magnetic element and the second magnetic element is not a permanent magnet but configured to be magnetized when in contact with the permanent magnet.

12. The system according to claim 10, wherein an outer dimension of a first magnetic element of the multiple first magnetic elements substantially corresponds to an outer dimension of the second magnetic element.

13. The system according to claim 10, wherein a first magnetic element of the multiple first magnetic elements and the second magnetic element have substantially the same shape and the same size.

14. An earbud configured to be connected to an ear of a user, wherein the earbud is a wireless earbud, the earbud comprising:

a rechargeable power source, two charging electrodes configured to charge the rechargeable power source, and two second magnetic elements provided in the earbud, wherein each of the two second magnetic elements encloses one charging electrode of the two charging electrodes, wherein each of the two second magnetic elements is configured to generate an attractive force for the earbud in combination with a first magnetic element provided in a housing, and wherein the rechargeable power source is configured to be recharged when the earbud is located in the housing, and wherein the first magnetic element and the two second magnetic elements are permanent magnets, and wherein the first magnetic element and a first of the two second magnetic elements are arranged relative to one another such that they are located rotationally symmetric around an axis located in a center between the first magnetic element and the first of the two second magnetic elements when a rotation of 180 degrees is carried out around the axis.

15. The earbud according to claim 14, wherein the first of the two second magnetic elements has a circular shape.

\*    \*    \*    \*    \*